Feb. 4, 1941.    R. McGRATH    2,230,899
GEAR ADJUSTING MEANS
Filed Jan. 23, 1939

Ray McGrath
INVENTOR
BY Victor J. Evans & Co.
ATTORNEYS

Patented Feb. 4, 1941

2,230,899

UNITED STATES PATENT OFFICE 2,230,899

GEAR ADJUSTING MEANS

Ray McGrath, Bethlehem, Wheeling, W. Va.

Application January 23, 1939, Serial No. 252,444

7 Claims. (Cl. 74—424)

My invention relates broadly to internal combustion engines, and more particularly to an improved means for eliminating lost motion in the gearing thereof.

An important object of my invention is to provide a new and improved adjusting means for bevelled gears.

Another object of my invention is to provide an improved adjusting means for gears that can be adapted to all types of vehicles.

Still another object of my invention is to provide an improved adjusting means for gears that can be operated exteriorly of the housing enclosing the said gears.

Yet another object of my invention is to provide an improved adjusting means that will permit the gears carried by the drive and driven shaft in the differential of an automobile to be selectively varied in their inmeshed relation with each other.

A further object of my invention is to provide an improved adjusting means for gearing, that is simple in construction and efficient in operation.

Other objects and advantages of my invention will be apparent during the course of the following description.

Figure 1:
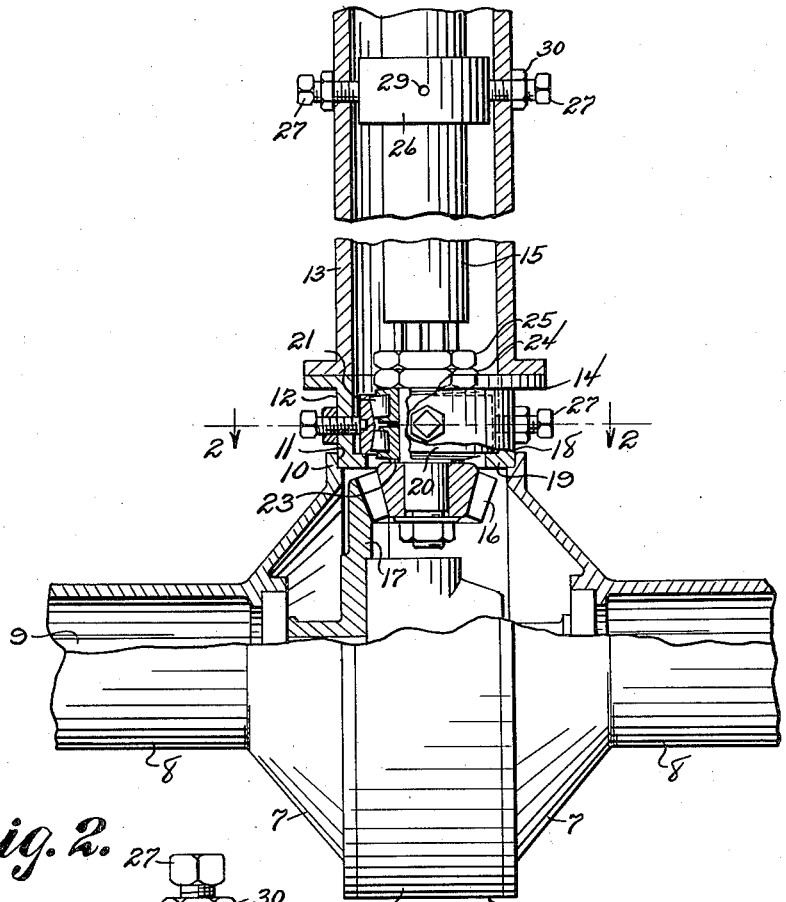
Figure 2:
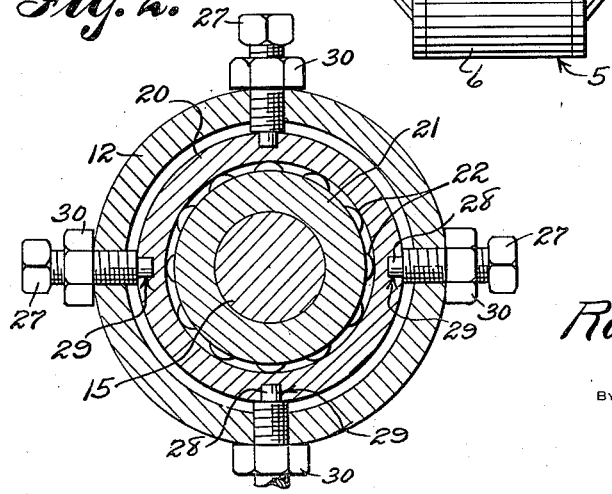

In the accompanying drawing, forming a part of this specification, and in which like numerals are employed to designate like parts throughout the same, Figure 1 is a plan view, partly in elevation and partly in section, of a device embodying my invention, and Figure 2 is a vertical sectional view, taken on the line 2—2 of Figure 1.

In the drawing, wherein for the purpose of illustration, is shown a preferred embodiment of my invention the numeral 5 designates a differential housing having a substantially circular central band 6 with either side 7 thereof converging outwardly therefrom and terminating in laterally disposed tubular portions 8, in which the driven shaft 9 is mounted for rotation. The central band 6 of the housing 5 is formed at one side with an outwardly extending annular flange 10 provided with an inner recess 11 in which is seated a flanged collar 12. An axle housing 13 is bolted, or otherwise secured, to the annular flange 14 of the collar 12 and receives the drive shaft 15 therein. The drive shaft 15 terminates adjacent the flange 10 of the differential housing 5 and has keyed thereon, for rotation therewith, the pinion 16 enmeshed with a ring gear 17 carried by the driven shaft 9.

The collar 12 is formed at its inner end 18 with an inner annular flange 19 upon which is seated the outer ring 20 of a roller bearing the inner ring 21 of which encircles and is secured to the drive shaft 15. The inner face of the ring 20 converges inwardly toward its middle to properly accommodate the tapered rollers 22 and retained by the inner ring 21. The ring 21 is spaced from the pinion 16 by the washer 23, and maintained in fixed spaced relation therewith by pal nuts 24 and 25 which are threaded on the drive shaft 15 in abutting relation to the outer side of the bearing.

A second ball race 26 is journaled on the drive shaft 15 adjacent its opposite end thereof, and the outer peripheries of the rings 20 and 26 are spaced slightly from the inner walls of the flange collar 12 and axle housing 13. Right angularly disposed adjusting bolts 27 are screw threadedly received in the axle housing 13 and collar 12, and have inwardly extending shanks 28, formed at their inner ends received in aligning recess 29 provided in the outer peripheries of the rings 20 and 26. Lock nuts 30 are threaded on the bolts 27 exteriorly of the flanged collar 12 and axle housing 13 in close frictional engagement therewith to securely maintain the bolts 27 against displacement.

In operation, the pinion and ring gear in the differential of an automobile is often subjected to comparatively great wear, and in time the interlocking relation between these gears becomes very loose, and unless properly adjusted, considerable lost motion is evident and the operation thereof is generally inefficient and unsatisfactory. My device provides an adjusting means that may be quickly and efficiently operated exteriorly of the housing in a manner whereby it is entirely unnecessary to dismantle the differential in making this adjustment. Should the interlocking engagement between the pinion and ring gear become loose and inefficient the lock nuts 30 may be loosened, and adjusting bolts 27 rotated inwardly or back away therefrom to move the lower end of the drive shaft 15 closer to the ring gear, thereby causing the teeth of the pinion journaled thereon to interlock more snugly with the teeth of the ring gear. When the adjustment has been properly attained the lock nuts 30 are threaded tightly against the outer surface of the housing and collar, thus maintaining the adjusting bolts 27 in the desired position.

It is to be understood that the form of my invention herewith shown and described is to be taken as a preferred example of the same, and that various changes in the size, shape and arrangement of parts may be resorted to without departing from the spirit of my invention, or the scope of the appended claims.

Having thus described my invention, I claim:

1. In an automotive differential, the combination of a drive shaft, a pinion fixedly mounted on the end of the said drive shaft, a ball race carried by the drive shaft adjacent the said pinion, a housing receiving the drive shaft and being circumferentially spaced from the said ball race, a driven shaft, a gear carried by the driven shaft and enmeshed with the said pinion, and right angularly disposed diametrically opposed adjusting bolts threadedly received in the said housing and engaging the said ball race, adjustment of the said bolts effecting movement of the pinion relative to the said second gear.

2. In an automotive differential, the combination of a drive shaft, a pinion fixedly mounted on the end of the said shaft, ball races adjacent the ends of the said shaft, a housing receiving the drive shaft and being circumferentially spaced from the said ball races, a driven shaft, a ring gear journaled on the driven shaft and enmeshed with the said pinion, and right angularly disposed diametrically opposed adjusting bolts screw threadedly received in the housing and engaging the said ball races, adjustment of the said bolts effecting movement of the pinion relative to the said ring gear.

3. In an automotive differential, the combination of a drive shaft, a pinion fixedly mounted on the end of the said drive shaft, a ball race secured to the drive shaft adjacent the said pinion, and having right angularly disposed diametrically opposed recesses in its outer periphery, a housing receiving the drive shaft and being circumferentially spaced from the said ball race, a driven shaft, a ring gear journaled to the driven shaft and enmeshed with the said pinion, and adjusting bolts carried by the housing and with the inner ends thereof received in the recesses in the said ball race, whereby adjustment of the said bolts will effect movement of the pinion relative to the said ring gear.

4. In an automotive differential, the combination of a drive shaft, a pinion fixedly mounted on the end of the said drive shaft, a ball race secured to the drive shaft adjacent the said pinion, and having right angularly disposed diaametrically opposed recesses in its outer periphery, a housing receiving the drive shaft and being circumferentially spaced from the said ball race, a driven shaft, a ring gear journalled to the driven shaft and enmeshed with the said pinion, adjusting bolts carried by the housing and with the inner ends thereof received in the recesses in the said ball race, whereby adjustment of the said bolts will effect movement of the pinion relative to the said ring gear, and means to hold the said adjusting bolts against displacement.

5. In an automotive differential, the combination of a drive shaft, a pinion fixedly mounted on the end of the said shaft, ball races adjacent the ends of the said shaft, having right angularly disposed diametrically opposed recesses in their outer peripheries, a housing receiving the drive shaft and being circumferentially spaced from the said ball races, a driven shaft, a ring gear journaled on the driven shaft and enmeshed with the said pinion, and adjusting bolts carried by the housing and with the inner ends thereof received in the recesses in the said ball races, whereby adjustment of the said bolts will effect movement of the pinion relative to the said ring gear.

6. In an automotive differential, the combination of a drive shaft, a pinion fixedly mounted on the end of the said shaft, ball races adjacent the ends of the said shaft, having right angularly disposed diametrically opposed recesses in their outer peripheries, a housing receiving the drive shaft and being circumferentially spaced from the said ball races, a driven shaft, a ring gear journaled on the driven shaft and enmeshed with the said pinion, adjusting bolts carried by the housing and with the inner ends thereof seated in the recesses in the said ball races, whereby adjustment of the said bolts will effect movement of the pinion relative to the said ring gear, and means to hold the said adjusting bolts against displacement.

7. In an automotive differential assembly including a differential housing having an axle shaft and ring gear mounted for rotation therein and a drive shaft carrying a pinion in meshed relation with the said ring gear, said drive shaft extending for its entire length axially within a tubular casing one end of which is fixedly secured to the differential housing, means for eliminating lost motion between the pinion and ring gear comprising roller bearings carried by the drive shaft and spaced from the internal bore of the casing, and bolts threadedly received by and spaced circumferentially around the casing and with the inner ends thereof engaging the outer ring of the said roller bearings whereby advancement and retraction of the bolts will shift the drive shaft laterally within the casing to move the pinion relative to the said ring gear.

RAY McGRATH.